(12) United States Patent
Caprera (10) Patent No.: US 7,726,339 B2
(45) Date of Patent: Jun. 1, 2010

(54) SEAL CARTRIDGE CONTROL VALVE

(75) Inventor: Brian J. Caprera, Warwick, RI (US)

(73) Assignee: Dresser, Inc., Addison, TX (US)

( * ) Notice: Subject to any disclaimer, the term of this patent is extended or adjusted under 35 U.S.C. 154(b) by 665 days.

(21) Appl. No.: 11/601,067

(22) Filed: Nov. 17, 2006

(65) Prior Publication Data
US 2007/0164517 A1   Jul. 19, 2007

Related U.S. Application Data

(60) Provisional application No. 60/758,661, filed on Jan. 14, 2006.

(51) Int. Cl.
*F16K 37/00* (2006.01)
*F16J 15/18* (2006.01)
(52) U.S. Cl. .................. 137/625.33; 277/531
(58) Field of Classification Search ............ 137/625.33, 137/625.37, 625.38; 277/339, 466, 510, 277/511, 529, 530, 531, 535, 537, 541
See application file for complete search history.

(56) References Cited

U.S. PATENT DOCUMENTS

| | | |
|---|---|---|
| 1,384,432 A | 7/1921 | Dempler |
| 1,546,525 A | 7/1925 | Wasson |
| 2,117,182 A | 5/1938 | Lewis |
| 3,067,977 A | 12/1962 | Anderson et al. |
| 3,098,660 A * | 7/1963 | Hausner ............... 277/530 |
| 3,187,775 A | 6/1965 | Pinnell |
| 3,191,906 A | 6/1965 | Ziegler et al. |
| 3,380,706 A | 4/1968 | Scaramucci |
| 3,394,915 A | 7/1968 | Gachot |
| 3,403,887 A | 10/1968 | Myers |
| 3,458,170 A | 7/1969 | Vogeli |

(Continued)

FOREIGN PATENT DOCUMENTS

| DE | 28 27 527 | 1/1980 |
|---|---|---|
| EP | 0 864 788 | 9/1988 |

OTHER PUBLICATIONS

Cavitrol® III One-, Two-, and Three-Stage Trims, Sep. 2002, Product Bulletin 80.2:030, Emerson Process Management, www.Fisher.com, 11 pages.

(Continued)

*Primary Examiner*—John Fox
(74) *Attorney, Agent, or Firm*—Fish & Richardson P.C.

(57) ABSTRACT

A flexible seal ring includes a first sealing face and a rear face is disposed opposite the front sealing face, the rear face is axially offset relative to the front sealing face. An upper face disposed between the front face and the rear face, the upper face extending from the rear face towards the front face such that an interior angle between the upper face and the rear face is greater than 110 degrees. Another flexible seal ring includes a first front sealing face, a rear face, at least one downwardly disposed upper face disposed between the front face and the rear face, at least one downwardly disposed lower face, and a second front sealing face disposed between the downwardly disposed lower face and the first front sealing face. A cartridge seal includes a flexible seal ring and an upper retaining ring.

22 Claims, 8 Drawing Sheets

U.S. PATENT DOCUMENTS

| | | | |
|---|---|---|---|
| 3,488,033 | A | 1/1970 | Priese |
| 3,497,176 | A | 2/1970 | Priese |
| 3,801,066 | A | 4/1974 | Miles et al. |
| 3,834,663 | A | 9/1974 | Donnelly |
| 4,044,994 | A | 8/1977 | Priese |
| 4,078,582 | A | 3/1978 | Hetz |
| 4,111,393 | A | 9/1978 | McClurg et al. |
| 4,114,856 | A | 9/1978 | MacAfee et al. |
| 4,157,170 | A | 6/1979 | McClurg |
| 4,169,604 | A * | 10/1979 | Heathcott ............... 277/529 |
| 4,195,815 | A | 4/1980 | Stager |
| 4,210,313 | A | 7/1980 | Chester |
| 4,228,816 | A | 10/1980 | Aoki |
| 4,231,546 | A | 11/1980 | Eggleston et al. |
| 4,281,817 | A | 8/1981 | Adams et al. |
| 4,290,581 | A | 9/1981 | Moran et al. |
| 4,378,104 | A | 3/1983 | Ben-Ur |
| 4,470,607 | A * | 9/1984 | Schier et al. ............. 277/530 |
| 4,513,946 | A | 4/1985 | Priese |
| 4,557,461 | A | 12/1985 | Gomi et al. |
| 4,634,095 | A | 1/1987 | Taylor |
| 4,660,591 | A | 4/1987 | Brown et al. |
| 4,671,308 | A | 6/1987 | Williams et al. |
| 4,732,364 | A | 3/1988 | Seger et al. |
| 4,848,778 | A | 7/1989 | Von Pragenau |
| 4,899,980 | A | 2/1990 | Kemp |
| 4,909,520 | A | 3/1990 | Gallagher |
| 5,016,857 | A | 5/1991 | Bovee et al. |
| 5,137,259 | A | 8/1992 | Stein |
| 5,141,028 | A * | 8/1992 | Cohen ................. 137/625.3 |
| 5,152,503 | A | 10/1992 | Conway |
| 5,295,662 | A | 3/1994 | Yamaji et al. |
| 5,297,777 | A | 3/1994 | Yie |
| 5,392,826 | A | 2/1995 | Saville et al. |
| 5,516,079 | A | 5/1996 | Baumann |
| 5,524,863 | A | 6/1996 | Davis |
| 5,685,520 | A | 11/1997 | Velan |
| 5,735,501 | A | 4/1998 | Maurer et al. |
| 5,904,337 | A | 5/1999 | VanKirk et al. |
| 6,021,812 | A | 2/2000 | Iwamoto et al. |
| 6,024,122 | A * | 2/2000 | Steinke ................. 137/545 |
| 6,182,974 | B1 * | 2/2001 | Harrelson, III ........... 277/537 |
| 6,267,353 | B1 | 7/2001 | Friedline et al. |
| 6,267,383 | B1 * | 7/2001 | Morvant ................ 277/439 |
| 6,375,050 | B1 | 4/2002 | Gruson |
| 6,378,842 | B1 | 4/2002 | Frese et al. |
| 6,517,080 | B1 * | 2/2003 | Pressler ................. 277/440 |
| 6,533,241 | B1 | 3/2003 | Chen |
| 6,685,167 | B2 | 2/2004 | Robison et al. |
| 6,840,502 | B2 | 1/2005 | Haushaelter et al. |
| 2002/0017327 | A1 | 2/2002 | Kawaai et al. |
| 2004/0238050 | A1 | 12/2004 | Hamblin et al. |

OTHER PUBLICATIONS

Copes-Vulcan® Hush® Trim, Mar. 2002, Bulletin 1124, SPX Valves & Controls™, 6 pages.

Design D4 Control Valve Assembly (Spring-to-Close), Instruction Manual, Form 5755, Emerson Process Management, www.Fisher.com, Apr. 2004, 1 page.

Dirty Service Anti-Cavitation Trim (DST), Aug. 2002, Product Bulletin 80.2:021, Emerson Process Management, www.Fisher.com, 4 pages.

Drag® Valves for Boiler Feedpump Recirculation, Control Components, Inc., 6 pages.

Masoneilan® 41005 Series Control Valves, Dresser-Flow Control, SD CH3000 Mar. 2002, 28 pages.

Notification of Transmittal of the International Search Report and the Written Opinion of the International Searching Authority, or the Declaration (2 pages), International Search Report (5 pages), and Written Opinion of the International Searching Authority (7 pages) for International Application No. PCT/US2006/062167 mailed Apr. 8, 2008.

Notification Concerning Transmittal of International Preliminary Report on Patentability (Chapter I of the Patent Cooperation Treaty) for corresponding International Application No. PCT/US2006/062167 mailed on Jul. 24, 2008.

* cited by examiner

SEAL CARTRIDGE CONTROL VALVE

CROSS REFERENCE TO RELATED APPLICATIONS

This application claims the benefit of U.S. Provisional Patent Application No. 60/758,661, filed Jan. 14, 2006, which is incorporated herein by reference in its entirety

TECHNICAL FIELD

This invention is directed generally to sealing systems for valves and more specifically to a pressure balanced seal ring and a seal cartridge unit for a control valve.

BACKGROUND

A typical control valve has a linear motion closure member commonly referred to as a plug (or piston), one or more ports, and a body typically distinguished by a globular shaped cavity around the port region. The body is the part of the valve which is the main pressure boundary. The body typically provides the pipe connecting ends and the fluid flow passageway. In a control valve, the closure member is a movable part of the valve that is positioned in the flow path to modify the rate of flow through the valve.

The plug closure member is a part, often cylindrical in nature, which moves in the flow stream with linear motion to modify the flow rate. It may or may not have a contoured portion to provide flow characterization. It may also be a cylindrical or conically tapered part. In other types of valves, the closure member includes ball, disk and gate.

A flow orifice in the flow passageway (path) interacts with the closure member to close the valve. The orifice may be provided with a seating surface, to be contacted by or closely fitted to the closure member, to provide tight shut-off or limited leakage, i.e., to close the valve.

A cage, guide or liner is typically a part in a control valve that generally surrounds the closure member to provide alignment and facilitate assembly of other parts of the valve trim. The cage may also provide flow characterization and/or a seating surface. Control valve trim typically includes the internal parts of a valve which are in flowing contact with the controlled fluid. Examples of valve trim are the plug, seat ring and cage. The body is not considered part of the trim.

Figure 1:
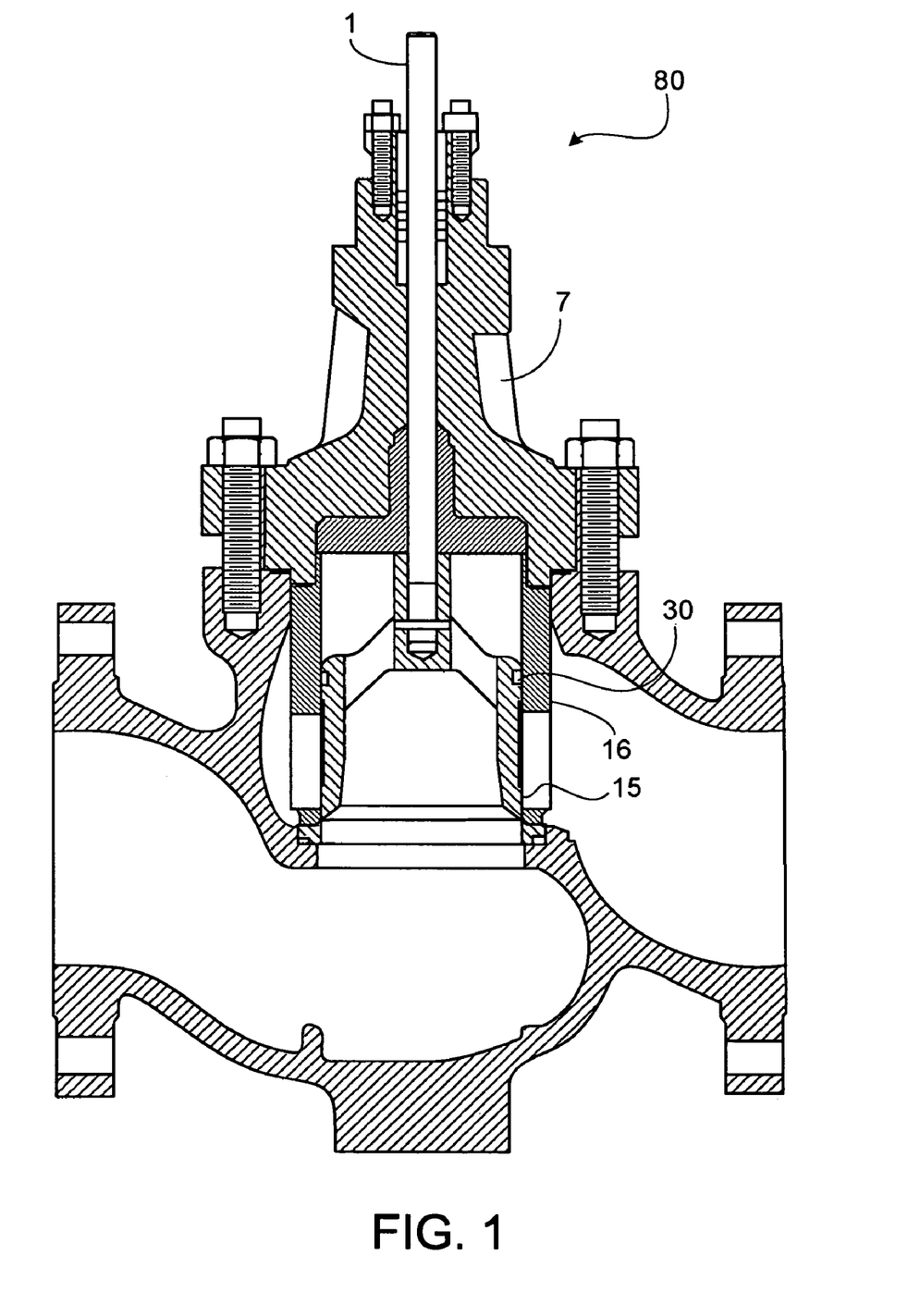
FIG. 1 is a cross-sectional view of a prior art control valve.
Figure 2A:
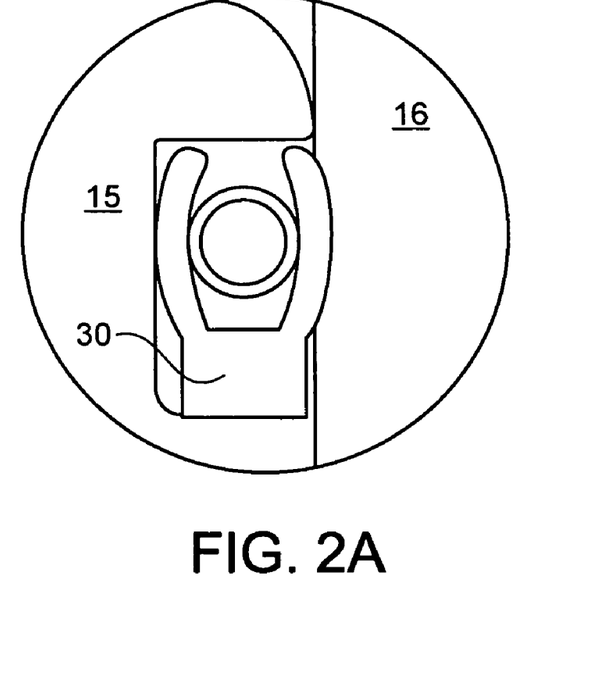
FIGS. 2A and 2B are enlarged partial cross-sectional views of seals used in the valve of FIG. 1.
Figure 2B:
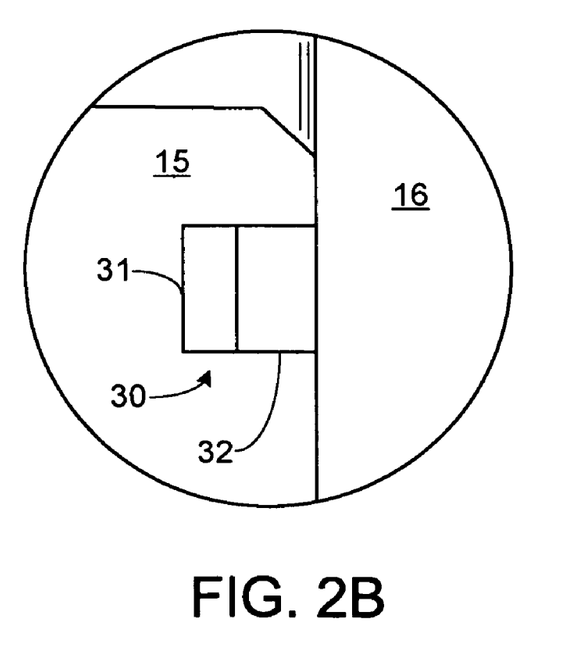

FIG. 1 illustrates a standard prior art control valve 80 manufactured and sold by Dresser, Inc.'s Masoneilan® division. A valve stem 1 extends through a valve bonnet 7 to a valve plug 15. Valve plug 15 is received in a cage 16. A seal 30 is disposed between the plug 15 and the inner wall of cage 16. FIGS. 2A and 2B illustrate different embodiments of the seal 30 between the plug (piston) 15 and the inner wall of cage 16. FIG. 2B shows a two-part seal with an inner member 31 that can be formed of Ni-Resist metal and an outer member 32 that can be formed of structural graphite. In this valve, the seal is located in a seal groove (gland) on the plug. In other variations, the seal may be located in a seal groove on the cage wall.

TABLE 1

| Valve Model | Seal Type | Valve Size (inches) | Valve Size (Mm) | Temperature Range[1] Minimum | Temperature Range[1] Maximum | Seat Leakage per IEC 534-4 and ANSI/FCI 70.2 Class |
|---|---|---|---|---|---|---|
| 41305 | Pressure Energized PTFE Seal Ring | 2-16 | 50-400 | −50° F. (−46° C.) | +450° F. (+232° C.) | IV (standard) V (optional) |
| 41405 | Auxiliary Pilot Plug with Metal Seal Ring | 2-4 | 50-100 | −320° F. (−196° C.) | +850° F. (+454° C.)[2] | IV (standard) V (optional) |
| | | 6-16 | 150-400 | −320° F. (−196° C.) | +1050° F. (+566° C.) | |
| 41505 | Metal Seal Ring | 2-4 | 50-100 | −320° F. (−196° C.) | +850° F. (+454° C.)[2] | II |
| | | 6-16 | 150-400 | −320° F. (−196° C.) | +1050° F. (+566° C.) | III |
| 41605 | PTFE Seal Ring | 2-16 | 50-400 | −20° F. (−29° C.) | +300° F. (+149° C.) | IV |
| 41905 | Graphite Seal Ring | 2-4 | 50-100 | −320° F. (−196° C.) | +850° F. (+454° C.) | IV |
| | | 6-16 | 150-400 | −320° F. (−199° C.) | +850° F. (+454° C.) | |

Notes:
[1] See Materials of Construction Tables for other temperature limitations.
[2] Maximum temperature limit for the 2° (50 mm) size is +1050° F. (+566° C.)

Table 1 includes information on the manufacturer's suggestions regarding selection of the particular type of seal depending on the temperature range of the fluid flowing through the valve. In high temperature service, the prior art valves use rigid graphite seals. These rigid seals include a split or break in the circumference that allows the seal to conform to the diameter of the sealing surface. Such a split ring seal is similar to a piston ring used to seal an internal combustion engine piston in the engine cylinder. Because the circumference of the seal ring is split, fluid leaks across the seal.

Other prior art high temperature seals may be-formed of compressed flexible graphite. This flexible graphite prior art seal results in a high sliding friction, and a high rate of wear makes it unsuitable for automated positioning/throttling applications of control valves.

SUMMARY

In one aspect, a seal cartridge including a flexible seal ring provides high pressure sealing capabilities in high temperature environments using a pressure balanced seal. The seal accommodates the manufacturing tolerances between the plug, the cage and the ring groove.

In one aspect, a seal cartridge includes a flexible seal ring disposed in a seal groove. The flexible seal ring includes a first front sealing face adapted for sealing contact with the outer surface of the plug, a rear face, at least one downwardly disposed upper face, said face being disposed between the front face and the rear face, at least one downwardly disposed lower face, and a second front sealing face disposed upwardly between the downwardly disposed lower face and the first front sealing face. Some seal cartridges also include an upper retaining ring disposed adjacent to the flexible seal ring. The upper retaining ring can include at least one downwardly disposed lower face disposed proximal to the downwardly disposed upper face of the flexible seal ring. The at least one upper face of the flexible seal ring can be adapted to flex away from the at least one downwardly disposed upper face of the upper retaining ring, and the lower face of the flexible seal ring can be adapted to flex downward.

In one aspect, a flexible seal ring engages an outer surface of the plug to form a high temperature and high pressure seal between the outer surface of the plug and a cage wall of the control valve. The flexible seal ring may be disposed in a seal groove (e.g., a seal groove in the cage wall or a seal groove in the outer surface of the plug). The flexible seal ring has a first front sealing face adapted for sealing contact that is oriented towards an aperture of the seal groove, a rear face, at least one downwardly disposed upper face, said face being disposed between the front face and the rear face. The seal ring may include an upper face disposed between front face and face. The seal ring further includes at least one downwardly disposed lower face, and a second front sealing face disposed upwardly between the downwardly disposed lower face and the first front sealing face. The at least one upper face of the flexible seal ring can be adapted to flex downward, the lower face of the flexible seal ring can be adapted to flex downward, and the second front sealing face of the flexible seal ring can be adapted to flex toward the aperture of the seal groove. The seal cartridge may include only flexible seal ring or may alternatively contain additional elements.

In one aspect, a flexible seal ring for sealing an outer surface of a plug to a cage wall in a control valve includes a first sealing face adapted for sealing contact with the outer surface of the plug, a rear face disposed opposite the first sealing face with the rear face axially offset relative to the first sealing face; and an upper face disposed between the first face and the rear face. The upper face extends from the rear face towards the front face such that an interior angle between the upper face and the rear face is greater than 110 degrees.

The design of the seal maintains the flexible seal ring in compression. Materials used in the manufacture of the flexible seal ring for high temperature applications are typically brittle but have high compression strengths with lower tensile strengths. Therefore, the flexible seal ring design of the present invention maintains the flexible seal ring in compression through the torsional twisting (e.g., torsional rotation of the seal ring about a circumferential axis of the seal ring) of the seal ring when it is pressure energized.

When assembled, the seal cartridge can be disposed into a ring groove of a cage wall and held in place by a locking ring. It will be understood that, in other embodiments, the seal cartridge of the present invention may be disposed in a seal groove on the plug instead of in a seal groove on the cage wall. In some embodiments, an inner surface of the sealing ring comprises the front sealing face. The front sealing face can be oriented towards the outer surface of the plug. In some embodiments, an outer surface of the sealing ring comprises the front sealing face. The front sealing face can be oriented towards the inner wall of the cage.

In some embodiments, the cartridge seal is configured to be disposed in a seal groove in the wall of the cage and the second front sealing face of the flexible seal ring is adapted to flex toward the plug. In some cases, the cartridge seal also includes a split ring seal element disposed in a recess in a portion of the first lower retaining ring that is disposed toward the plug. In some embodiments, the cartridge seal is configured to be disposed in a seal groove in the outer surface of the plug and the second front sealing face of the flexible seal ring is adapted to flex toward the wall of the cage. In some cases, the cartridge seal also includes a split ring seal element disposed in a recess in a portion of the first lower retaining ring that is disposed toward the wall of the cage.

In some embodiments, seal rings also include a lower surface including a second sealing face and a lower face, the second sealing face extending from the first sealing face to the lower face such that an interior angle between the first and second sealing faces is greater than 140 degrees and the lower face extending from the second sealing face to the rear face.

The cartridge seal may further include an upper retaining ring disposed adjacent to the flexible seal ring. The upper retaining ring can include braided long strand carbon fibers.

The cartridge seal may further include a first lower retaining ring disposed adjacent to the flexible seal ring. The lower retaining ring can include: at least one upper face disposed proximal to the downwardly disposed lower face of the flexible seal ring, wherein said lower face of the flexible seal ring being adapted to flex toward the at least one upper face of the lower retaining ring. The lower retaining ring can include a upper lip that contacts the at least one upwardly disposed front face of the sealing ring.

The cartridge seal may, but is not required, to include a split ring seal element disposed in a recess in a portion of the first lower retaining ring.

In some embodiments, the flexible seal ring comprises a unitary ring. The flexible seal ring can include (e.g., be made of) polyetheretherketone (PEEK), graphite, Ni-resist metal, and/or hard-faced metal (e.g., 347 ss, 316 ss, etc).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 3:
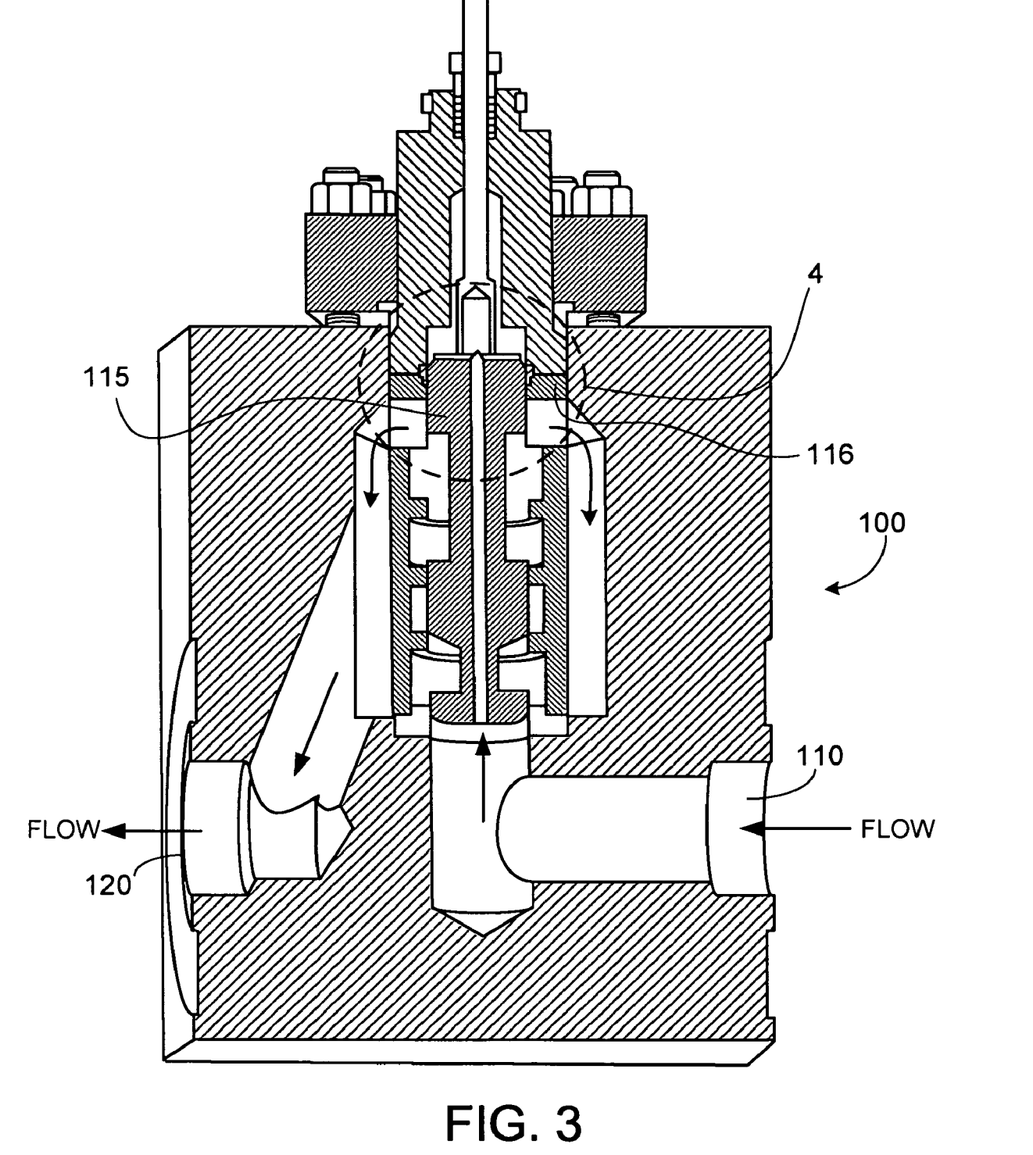
FIG. 3 is a cross-sectional view of a control valve with the seal cartridge of the present invention.

Referring to FIG. 3, a control valve 100 includes inlet port 110 and outlet port 120. Plug 115 is movably disposed in cage 116. As used herein, the term "cage" is intended to encompass a cage, liner, guide, and the structural and functional equivalents thereof. As used herein, the term "plug" is intended to encompass a plug or piston and the structural and functional equivalents. As used herein, the term "seal groove" is intended to encompass a groove, recess, gland, and the structural and functional equivalents. As used herein, the term "fluid" includes gas, water, oil, particulate matter, and any combination thereof.

Figure 4:
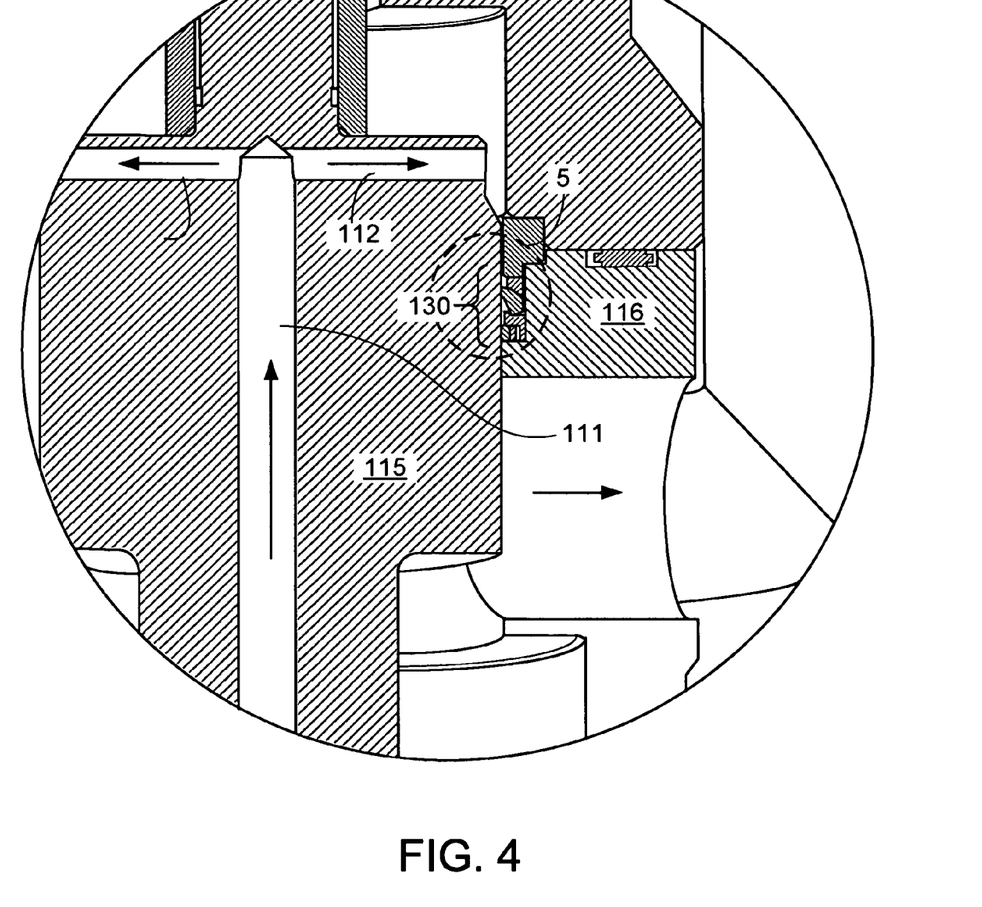
FIG. 4 is an enlarged partial cross-sectional view of the seal cartridge, plug, and cage of the valve of FIG. 3.

Referring to FIG. 4, pressure balanced seal cartridge 130 is disposed between plug 115 and cage 116. Fluid travels through opening 111 in plug 115 and splits into openings 112 and exits the plug. This can somewhat balance the pressure present on opposite sides of plug 115 and, thus, can reduce the size of actuator required to operate the valve. It will be understood that the direction of flow may be reversed in the valve 100, but if the flow is reversed the seal cartridge as described herein must be installed upside down in order for the fluid pressure to energize the seal properly. The mechanisms by which the seal is energized to engage plug 115 and the wall of cage 116 are discussed in more detail below.

Referring to FIGS. 5, 6, 7A, and 7B, the cartridge seal 130 engages an outer surface of the plug 115 to form a high temperature and high pressure seal between the outer surface of the plug 115 and the wall of the cage 116 in the control valve 100 (see FIG. 3). The cartridge seal 130 includes a flexible seal ring 131 disposed in a seal groove 138 in the cage wall 116. The flexible seal ring 131 has a first front sealing face 150 (e.g., on an inner side of the ring) adapted for sealing contact with the outer surface of the plug 115, a rear face 156 (e.g., on an outer side of the ring), and at least one downwardly disposed first upper face 154, said face 154 being disposed between the front face 150 and the rear face 156. The seal ring may also include a second upper face 152 disposed between front face 150 and first upper face 154. The seal ring 131 further includes at least one downwardly disposed lower face 158, and a second front sealing face 160 disposed upwardly between the downwardly disposed lower face 158 and the first front sealing face 150.

Figure 7A:
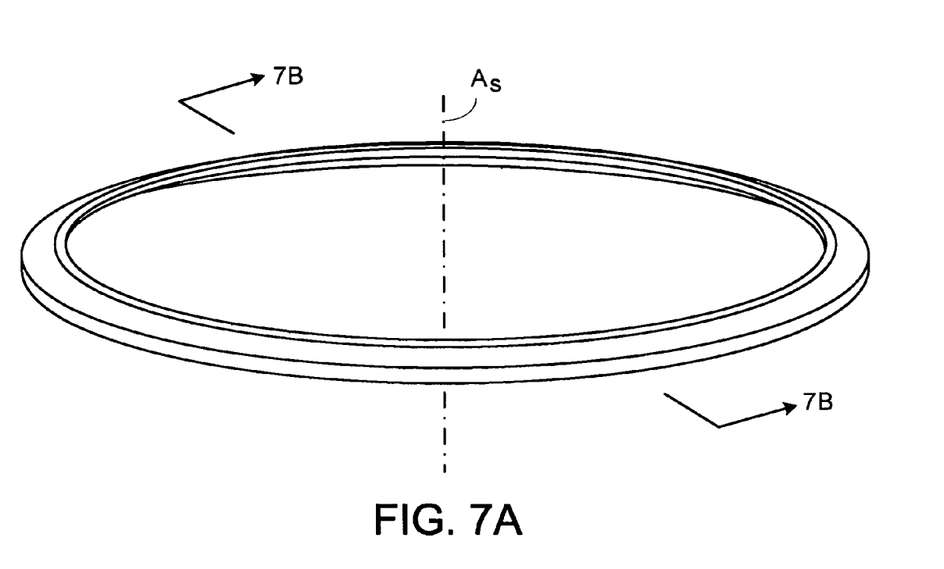
FIGS. 7A and 7B are, respectively, a perspective and a partial side view of the seal ring of the seal cartridge of FIGS. 5 and 6.
Figure 7B:
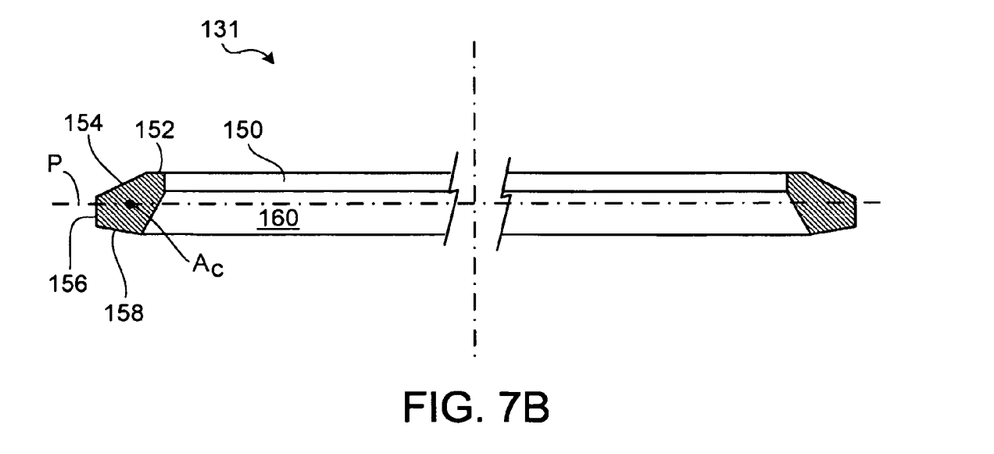

Referring to FIGS. 7A and 7B, seal ring can be a unitary ring formed as an annulus in plane P about a central seal axis As. First front sealing face 150 is axially offset from rear face 156 (e.g., front sealing face 150 is above plane P and rear face 156 is partially below plane P).

As used herein, "up" as used in reference to the seal ring indicates a direction from which energizing pressure is applied to the seal ring and "down" indicates an opposite direction. Thus, as valves can be oriented at various angles, up and down indicate relative rather than absolute directions.

Referring again to FIGS. 5 and 6, the cartridge seal 130 may, but is not required to, further include an upper retaining ring 133 disposed adjacent to the flexible seal ring 131. The upper retaining ring includes at least one downwardly disposed lower face 162 disposed proximal to the downwardly disposed upper face 154 of the flexible seal ring 131. The upper retaining ring 133 may include a front face 164 and a rear face 166 and a lower face portion 168.

Figure 5:
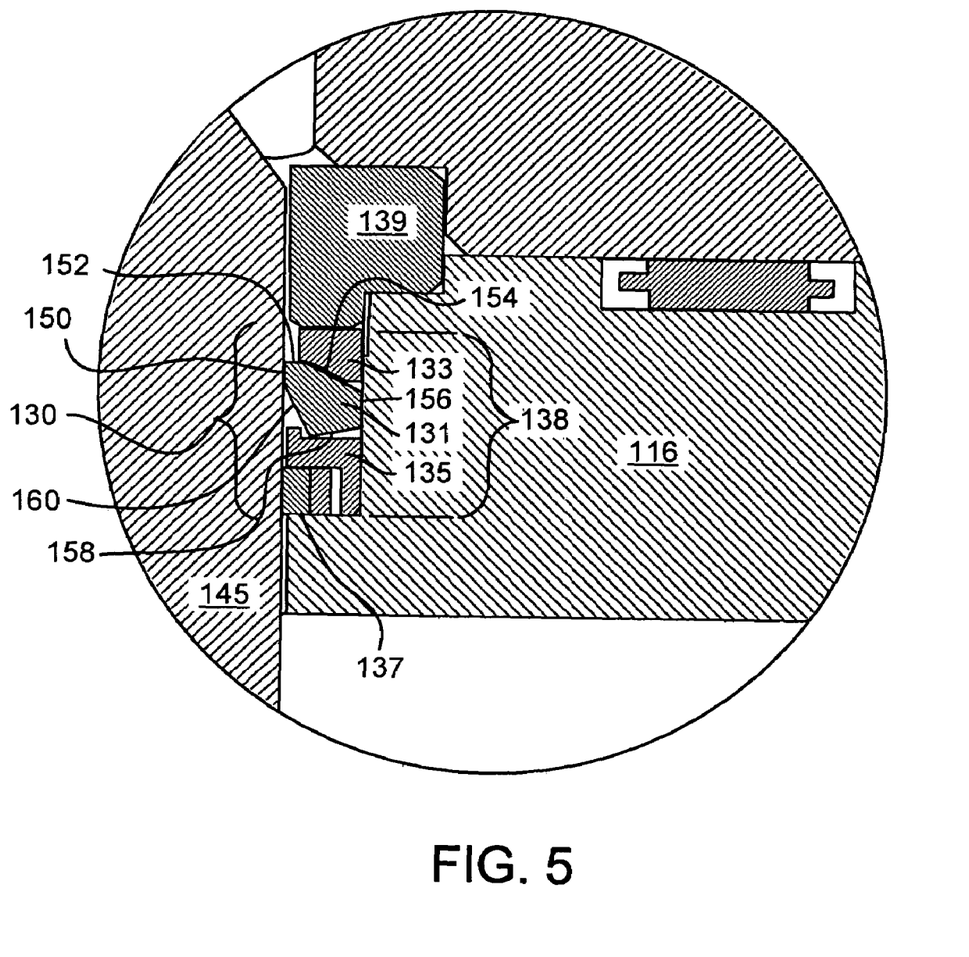
FIG. 5 is a further enlarged partial cross-sectional view of the seal cartridge, plug, and cage of the valve of FIG. 3.
Figure 6:
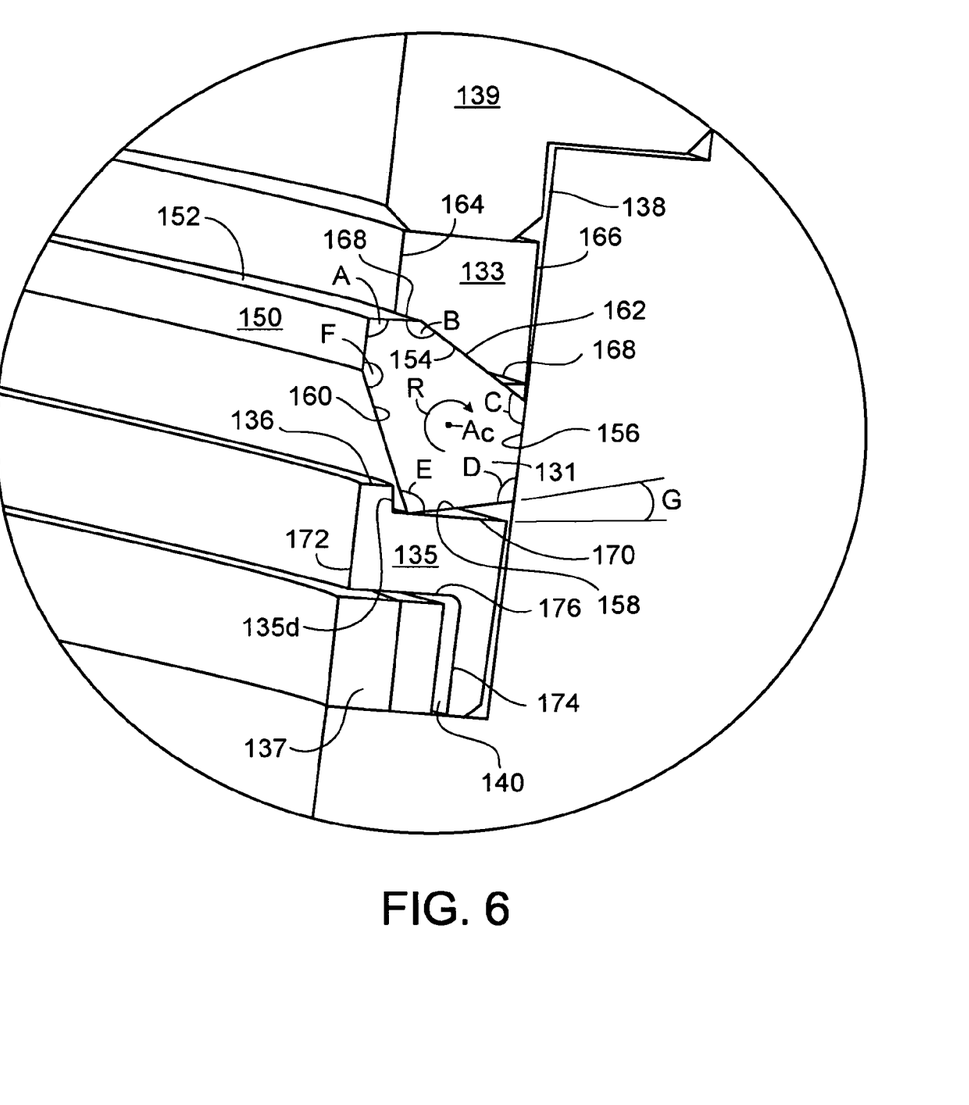
FIG. 6 is a partial perspective of the seal cartridge, plug and cage of the valve of FIG. 3.

The cartridge seal 130 may, but is not required to, further include a first lower retaining ring 135 disposed adjacent to the flexible seal ring 131. The lower retaining ring 135 includes at least one upper face 170 disposed proximal to the downwardly disposed lower face 158 of the flexible seal ring 131. The retaining ring 135 further includes a face 172 disposed toward the plug 115. The cartridge seal 130 may, but is not required to, include a second lower retaining ring 137 (e.g., a split ring seal element) disposed in a recess 140 in a portion of the first lower retaining ring 135. The retaining ring 135 may include faces 174 and 176 disposed toward the second lower retaining ring 137.

When assembled, the seal cartridge 130 is disposed into ring groove 138 of cage wall 116 and held in place by a locking ring 139. It will be understood that, in other embodiments, the seal cartridge 130 of the present invention may be disposed in a seal groove on the plug instead of in a seal groove on the cage wall. It will be understood that the present cartridge seal unit 130 may be used in any type of control valve with a linear moving plug. The cartridge seal's use is not limited to the valve embodiment illustrated in this specification.

When in operation, the pressure of the fluid flowing through the valve results in torsional rotation R of flexible seal ring 131 about a circumferential axis Ac. The point of engagement between the seal ring 131 and the plug 115 (e.g., front face 150) and the point of engagement between the seal ring 131 and the cage 116 (e.g., rear face 156) are not horizontal relative to the frame of reference in which up and down are as described above.

In the illustrated embodiment, contact of seal ring 131 with plug 115 and cage 116 as shown can provide an initial seal that can be effective for low pressures. As pressures are increased, the energizing pressure applied to upper face 154 can cause rotation of the torsional rotation R of flexible seal ring 131 about a circumferential axis and pivoting of the seal ring 131 about the intersection between lower face 158 and second sealing face 160. In some cases, as energizing pressure is applied to the upper side of the seal ring 131, the resulting compression can cause contact with the plug 115 and/or the cage 116 and can cause rotation of the seal ring 131 to provide an interference fit of the seal ring 131 with the plug 115 and the cage 116. The upper face 154 of the flexible seal ring 131 rotates away from the downwardly disposed upper face 162 of the upper retaining ring 133, and the lower face 158 of the flexible seal ring 131 rotates toward the upper face 170 of the lower retaining ring 135. The second front sealing face 160 contacts lip 136 of the first lower retaining ring 135. Fluid pressure on face 154 causes the second sealing face 160 to move forward and contact the plug 115.

In some instances, rotation of the seal ring 131 can accommodate gaps between the plug 115 and the cage 116 due to engineering tolerances. In some instances, the seal ring 131 can be a single continuous ring with an inner diameter sized to receive the plug 115 and to engage plug when energizing pressure is applied to the seal ring 131. In some cases, this configuration can reduce the leakage associated with split ring seals.

It is important to understand that cartridge seal 130 may comprise the single flexible seal ring 131 or may include both the seal ring 131 and retaining ring 133. Alternatively, retaining ring 135 may be added to elements 131 and 133 to form the cartridge seal 130. The cartridge seal 130 may further include split ring seal element 137.

The flexible seal ring 131 and split ring seal element 137 may be formed of material such as structural carbon graphite or polyetheretherketone (PEEK) or other material that preferably has properties to maintain structural integrity and strength at high temperatures. The rings 135 and 139 may be made of steel and retaining ring 133 may be formed from woven long strand braided carbon fibers. In some instances, brittle materials with the desired strength at high temperatures can be used to form the flexible seal ring 131 because the mechanism used to energize the seal can apply compressive forces to the seal ring 131. In some cases, the compression of the seal ring 131 between the plug 115 and the cage 116 can exceed the pressure differential between the upper and lower sides of the seal ring 131.

The angle (A) between the first sealing surface 150 and upper surface 152 is generally about 90 degrees, however, it may range from 80 to 100. The angle between faces 152 and 154 (obtuse angle B) is about 148 degrees. In some embodiments, angle B can range from 110 to 170 degrees. The angle between faces 154 and 156 (angle C) is about 121 degrees. In some embodiments, angle C can range from 110 to 140 degrees. The angle between faces 156 and 158 (angle D) is about 102 degrees. In some embodiments, angle D can range from 95 to 130 degrees. The angle between faces 158 and 160 (angle E) is about 102 degrees. In some embodiments, angle E can range from 90 to 145 degrees. The angle between faces 160 and 150 (angle F) is about 155 degrees. In some embodiments, angle F can range from 140 to 175 degrees.

The angle between retaining ring face 170 and flexible seal ring face 158 (angle G) is approximately 12 degrees. In some embodiments, angle G can range from 1 to 30 degrees (e.g., 5 to 30 degrees) prior to application of energizing pressure to the seal ring 131.

Cartridge seal 130 may be used in new valves designed expressly for this seal arrangement or may be used in existing control valve designs and used in lieu of other types of seal elements, including but not limited to those illustrated in FIGS. 2A and 2B. Cartridge seal 130 may be used in newly manufactured valves and may be used as a replacement for other types of seal elements in valves previously in service.

Figure 8:
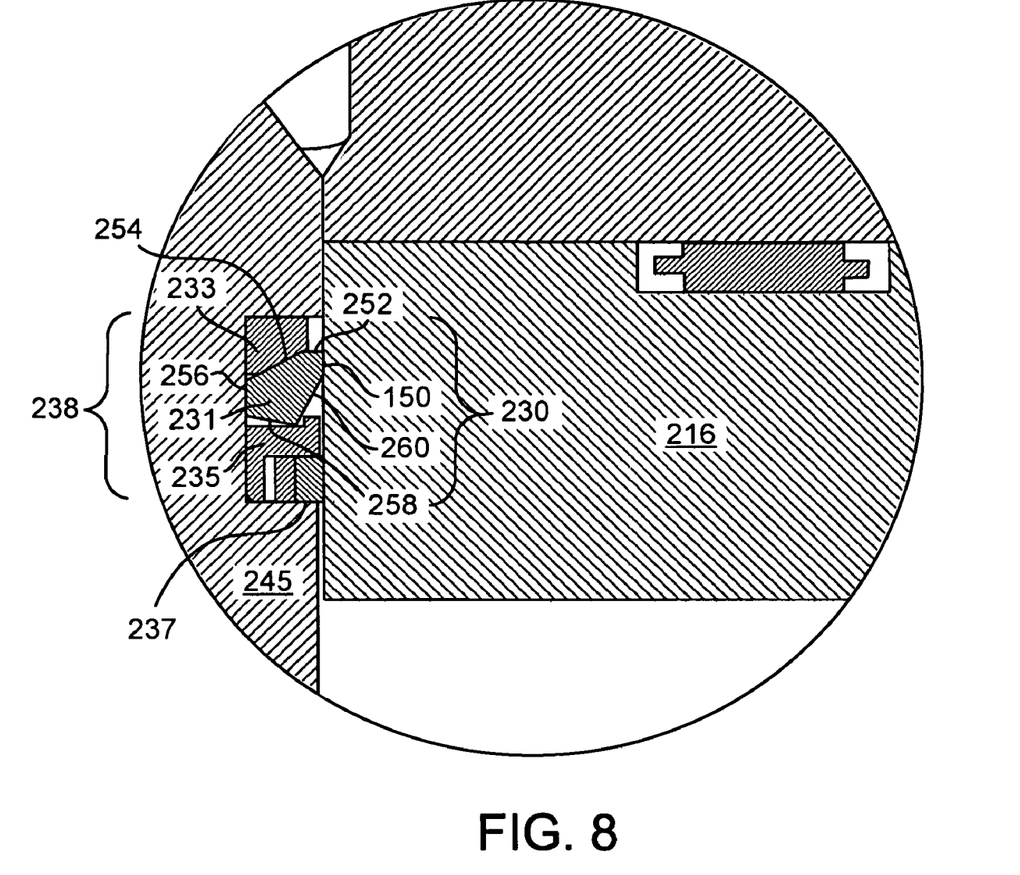
FIG. 8 is an enlarged partial cross-sectional view of the seal cartridge, plug, and cage of another embodiment of a valve.

A number of embodiments of the invention have been described. Nevertheless, it will be understood that various modifications may be made without departing from the spirit and scope of the invention. For example, the above angular dimensions are only intended to be representative of some embodiments of the invention and are not intended to limit the configuration of the faces of the various elements of seal cartridge 130 to the embodiments discussed. Additionally, it will be understood that the cartridge seal 130 of the present invention may be disposed in a seal groove on the plug instead of in a seal groove on the cage wall. For example, referring to FIG. 8, cartridge seal 230 can engage an outer surface of a plug 215 to form a high temperature and high pressure seal between the outer surface of the plug 215 and the wall of a cage 216 in a control valve. The cartridge seal 230 includes a flexible seal ring 231 disposed in a seal groove 238 in the wall of plug 216. The flexible seal ring 231 has a first front sealing face 250 (e.g., a face on an outer side of the ring) adapted for sealing contact with the inner surface of the cage 216, a rear face 256 (e.g., a face on an inner side of the ring), and at least one downwardly disposed first upper face 254, said face 254 being disposed between the front face 250 and the rear face 256. The seal ring may also include a second upper face 252 disposed between front face 250 and first upper face 254. The seal ring 231 further includes at least one downwardly disposed lower face 258, and a second front sealing face 260 disposed upwardly between the downwardly disposed lower face 258 and the first front sealing face 250. Cartridge seal 230 operates in a similar fashion to cartridge seal 130 except that directions of rotation and pivoting are reversed relative to those in cartridge seal 130. Accordingly, other embodiments are within the scope of the following claims.

What is claimed is:

1. A seal cartridge for sealing an outer surface of a plug to an inner wall of a cage in a control valve, the seal cartridge comprising:
   a flexible seal ring disposed in a seal groove, said flexible seal ring including:
      a first front sealing face adapted for sealing contact with the outer surface of the plug or with the inner wall of the cage,
      a rear face,
      at least one upper face disposed downwardly with respect to an up direction from which energizing fluid pressure is in use applied to the flexible seal ring upper face, said upper face being disposed between the first front sealing face and the rear face,
      at least one lower face, disposed downwardly with respect to said up direction, and
      a second front sealing face disposed upwardly with respect to said up direction between the downwardly disposed lower face and the first front sealing face; and
   an upper retaining ring disposed adjacent to the flexible seal ring, said upper retaining ring including:
      at least one lower face disposed downwardly with respect to said up direction and proximal to the downwardly disposed upper face of the flexible seal ring;
   wherein said at least one upper face of the flexible seal ring is adapted to flex away from the at least one downwardly disposed lower face of the upper retaining ring, and said lower face of the flexible seal ring is adapted to flex downward upon the application the energizing fluid pressure to the flexible seal ring upper face.

2. The cartridge seal of claim 1 further including a lower retaining ring disposed adjacent to the flexible seal ring, said lower retaining ring including:
   at least one upper face disposed proximal to the downwardly disposed lower face of the flexible seal ring,
   wherein said lower face of the flexible seal ring is adapted to flex toward the at least one upper face of the lower retaining ring.

3. The cartridge seal of claim 2 wherein the lower retaining ring includes a upper lip that contacts the at least one upwardly disposed second front sealing face of the sealing ring.

4. The cartridge seal of claim 2 wherein the flexure of the flexible seal ring comprises torsional rotation of the seal ring about a circumferential axis of the seal ring.

5. The cartridge seal of claim 2 wherein the flexible seal ring comprises polyetheretherketone (PEEK).

6. The cartridge seal of claim 2 wherein the flexible seal ring comprises graphite.

7. The cartridge seal of claim 2 wherein the upper retaining ring comprises braided long strand carbon fibers.

8. The cartridge seal of claim 2 wherein the cartridge seal is configured to be disposed in a seal groove in the wall of the cage and wherein said second front sealing face of the flexible seal ring is adapted to flex toward the plug.

9. The cartridge seal of claim 8 further including a split ring seal element disposed in a recess in a portion of the first lower retaining ring that is disposed toward the plug.

10. The cartridge seal of claim 2 wherein the cartridge seal is configured to be disposed in a seal groove in the outer surface of the plug and wherein said second front sealing face of the flexible seal ring is adapted to flex toward the wall of the cage.

11. The cartridge seal of claim 10 further including a split ring seal element disposed in a recess in a portion of the first lower retaining ring that is disposed toward the wall of the cage.

12. The cartridge seal of claim 1 wherein:
the rear face is disposed opposite the first front sealing face and is axially offset relative to the first front sealing face; and
the upper face extends from the rear face towards the first front sealing face such that an interior angle between the upper face and the rear face is greater than 110 degrees.

13. The cartridge seal of claim 12, wherein the second sealing face extends from the first sealing face to the lower face such that an interior angle between the first and second sealing faces is greater than 140 degrees and the lower face extends from the second sealing face to the rear face.

14. The cartridge seal of claim 12, wherein an inner surface of the sealing ring comprises the first sealing face.

15. The cartridge seal of claim 12, wherein an outer surface of the sealing ring comprises the first sealing face.

16. The cartridge seal of claim 12, wherein the flexible seal ring comprises a unitary ring.

17. A control valve including an inlet port, an outlet port, a plug movably disposed in a cage, and a seal cartridge for sealing an outer surface of the plug to an inner wall of the cage, the seal cartridge comprising:
a flexible seal ring disposed in a seal groove, said flexible seal ring including:
a first front sealing face adapted for sealing contact with the outer surface of the plug or with the inner wall of the cage,
a rear face,
at least one upper face, disposed downwardly with respect to an up direction from which energizing fluid pressure is in use applied to the flexible seal ring upper face, said face being disposed between the first front sealing face and the rear face, and
at least one lower face,
a second front sealing face disposed upwardly with respect to said up direction between the downwardly disposed lower face and the first front sealing face;
an upper retaining ring disposed adjacent to the flexible seal ring, said upper retaining ring including:
at least one lower face disposed downwardly with respect to said up direction and proximal to the downwardly disposed upper face of the flexible seal ring;
wherein said at least one upper face of the flexible seal ring is adapted to flex away from the at least one downwardly disposed lower face of the upper retaining ring, and said lower face of the flexible seal ring is adapted to flex downward upon the application the energizing fluid pressure to the flexible seal ring upper face.

18. A seal cartridge for sealing an outer surface of a plug to an inner wall of a cage in a control valve, the seal cartridge comprising:
a flexible seal ring disposed in a seal groove, said flexible seal ring including:
a first front sealing face adapted for sealing contact with the outer surface of the plug or with the inner wall of the cage,
a rear face,
at least one upper face, with respect to an up direction from which energizing fluid pressure is in use applied to the flexible seal ring upper face, the at least one upper face being disposed between the first front sealing face and the rear face,
at least one lower face, and
a second front sealing face disposed between the lower face and the first front sealing face; and
an upper retaining ring disposed adjacent to the flexible seal ring, said upper retaining ring including:
at least one lower face disposed downwardly with respect to said up direction and proximal to the downwardly disposed upper face of the flexible seal ring;
a lower retaining ring disposed adjacent to the flexible seal ring, said lower retaining ring including:
at least one upper face disposed proximal to the downwardly disposed lower face of the flexible seal ring,
wherein said lower face of the flexible seal ring is adapted to flex toward the at least one upper face of the lower retaining ring;
a split ring seal element disposed in a recess in a portion of the first lower retaining ring that is disposed toward the plug,
wherein the cartridge seal is configured to be disposed in a seal groove in the wall of the cage and wherein said second front sealing face of the flexible seal ring is adapted to flex toward the plug; and
wherein said at least one upper face of the flexible seal ring is adapted to flex away from the at least one downwardly disposed lower face of the upper retaining ring, and said lower face of the flexible seal ring is adapted to flex downward upon the application the energizing fluid pressure to the flexible seal ring upper face.

19. The cartridge seal of claim 18 wherein the lower retaining ring includes a upper lip that contacts the at least one upwardly disposed second front sealing face of the sealing ring.

20. The cartridge seal of claim 18 wherein the flexure of the flexible seal ring comprises torsional rotation of the seal ring about a circumferential axis of the seal ring.

21. The cartridge seal of claim 18 wherein:
the rear face is disposed opposite the first front sealing face and is axially offset relative to the first front sealing face; and
the upper face extends from the rear face towards the first front sealing face such that an interior angle between the upper face and the rear face is greater than 110 degrees.

22. The cartridge seal of claim 21, wherein the second sealing face extends from the first sealing face to the lower face such that an interior angle between the first and second sealing faces is greater than 140 degrees and the lower face extends from the second sealing face to the rear face.

* * * * *